United States Patent
Lu et al.

(10) Patent No.: US 11,691,854 B2
(45) Date of Patent: Jul. 4, 2023

(54) BIDIRECTIONAL ANTI-SLIPPING APPARATUS IN MONORAIL CRANE BASED ON INNER RATCHET MECHANISM

(71) Applicants: CHINA UNIVERSITY OF MINING AND TECHNOLOGY, Xuzhou (CN); XUZHOU LIREN MONORAIL TRANSPORTATION EQUIPMENT CO., LTD., Xuzhou (CN)

(72) Inventors: Hao Lu, Xuzhou (CN); Zhencai Zhu, Xuzhou (CN); Yidong Zhang, Xuzhou (CN); Yuxing Peng, Xuzhou (CN); Mai Du, Xuzhou (CN); Hengzhen Hu, Xuzhou (CN); Fuping Zheng, Xuzhou (CN); Yu Tang, Xuzhou (CN)

(73) Assignees: CHINA UNIVERSITY OF MINING AND TECHNOLOGY, Xuzhou (CN); XUZHOU LIREN MONORAIL TRANSPORTATION EQUIPMENT CO., LTD., Xuzhou (CN)

(*) Notice: Subject to any disclaimer, the term of this patent is extended or adjusted under 35 U.S.C. 154(b) by 0 days.

(21) Appl. No.: 18/157,621

(22) Filed: Jan. 20, 2023

(65) Prior Publication Data
US 2023/0150799 A1   May 18, 2023

Related U.S. Application Data

(63) Continuation of application No. PCT/CN2022/082953, filed on Mar. 25, 2022.

(30) Foreign Application Priority Data

Jun. 16, 2021  (CN) .......................... 202110665943.6

(51) Int. Cl.
*B66C 9/18* (2006.01)
*B66C 9/02* (2006.01)
(Continued)

(52) U.S. Cl.
CPC .................. *B66C 9/18* (2013.01); *B66C 9/02* (2013.01); *B66C 9/14* (2013.01); *B66C 9/16* (2013.01); *F16D 63/008* (2013.01)

(58) Field of Classification Search
CPC ............ B66C 11/00; B66C 9/00; B66C 9/02; B66C 9/14; B66C 9/16; B66C 9/18; B66C 7/04; B66C 13/06; F16D 63/008; F16D 55/00
(Continued)

(56) References Cited

U.S. PATENT DOCUMENTS 1,340,598 A * 5/1920 Brown ...................... B66C 9/18
                                                    188/43
3,762,512 A * 10/1973 McIntyre .................. B66B 5/22
                                                    188/189
(Continued)

FOREIGN PATENT DOCUMENTS

CN          202320307 U      7/2012
CN          103991795 A      8/2014
(Continued)

OTHER PUBLICATIONS

Written opinion of the International Searching Authority issued in International application No. PCT/CN2022/082953; dated Jun. 29, 2022; National Intellectual Property Administration, PRC, Beijing City, China; 9 pgs.
International Search Report issued in International application No. PCT/CN2022/082953; dated Jun. 29, 2022; National Intellectual Property Administration, PRC, Beijing City, China; 5 pgs.

*Primary Examiner* — Robert A. Siconolfi
*Assistant Examiner* — James K Hsiao
(74) *Attorney, Agent, or Firm* — Hauptman Ham, LLP

(57) ABSTRACT

A bidirectional anti-slipping apparatus includes a vehicle following stabilizing mechanism, a track, and two front and rear sets of locking mechanisms with opposite directions.

(Continued)

The vehicle following stabilizing mechanism includes a protective shell, a middle vehicle capable of sliding and a hydraulic cylinder configured to control the middle vehicle to slide are arranged in the protective shell, a front vehicle and a rear vehicle are respectively fixed at two front and rear ends of the protective shell. Each locking mechanism includes two left and right groups of ratchet devices, each of the ratchet devices includes a fixing rod, a plurality of inner ratchet wheels capable of rotating unidirectionally are respectively fixed at two ends of the fixing rod on one side of the fixing rod proximate to the track, the inner ratchet wheels on the two front and rear sets of locking mechanisms rotate in opposite directions.

10 Claims, 3 Drawing Sheets

(51) Int. Cl.
*B66C 9/14* (2006.01)
*F16D 63/00* (2006.01)
*B66C 9/16* (2006.01)

(58) Field of Classification Search
USPC .......................................................... 188/69
See application file for complete search history.

(56) References Cited

U.S. PATENT DOCUMENTS

| | | | | |
|---|---|---|---|---|
| 4,106,641 | A | * | 8/1978 | Campbell ................. B66C 5/04 414/142.8 |
| 4,706,570 | A | * | 11/1987 | Moro ........................ B66C 9/16 182/36 |
| 5,618,083 | A | * | 4/1997 | Martone ................... B60N 2/23 297/375 |
| 6,161,657 | A | * | 12/2000 | Zhuang ................. F16D 63/008 188/67 |
| 2005/0111012 | A1 | * | 5/2005 | Waisanen ................. B61K 9/08 356/622 |
| 2008/0083688 | A1 | * | 4/2008 | Lerchenmueller ........ B66C 9/16 212/312 |
| 2010/0282123 | A1 | * | 11/2010 | Golder ...................... B66C 9/16 105/163.1 |
| 2015/0321887 | A1 | * | 11/2015 | Kwon ....................... B66C 9/02 105/96 |

FOREIGN PATENT DOCUMENTS

| | | |
|---|---|---|
| CN | 205472286 U | 8/2016 |
| CN | 105936474 A | 9/2016 |
| CN | 108862031 A | 11/2018 |
| CN | 111675094 A | 9/2020 |
| CN | 113479769 A | 10/2021 |
| DE | 4122400 A1 | 1/1993 |
| JP | H10167052 A | 6/1998 |

* cited by examiner

BIDIRECTIONAL ANTI-SLIPPING APPARATUS IN MONORAIL CRANE BASED ON INNER RATCHET MECHANISM

CROSS REFERENCE TO RELATED APPLICATIONS

The present application is a continuation application of international PCT application serial no. PCT/CN2022/082953, filed on Mar. 25, 2022, which claims priority to Chinese patent application No. 202110665943.6 filed on Jun. 16, 2021, and entitled "BIDIRECTIONAL ANTI-SLIPPING APPARATUS IN MONORIAL CRANE BASED ON INNER RATCHET MECHANISM". The contents of both applications are hereby incorporated by reference in the present application.

TECHNICAL FIELD

The present disclosure relates to the field of transportation equipment, and in particular to a bidirectional anti-slipping apparatus in a monorail crane based on an inner ratchet mechanism.

BACKGROUND

Coal mine auxiliary transportation is an important part in coal mine production, which undertakes the important tasks for transporting operators, mining equipment and gangues. As important modern efficient auxiliary transportation equipment, monorail crane has incomparable advantages over small winches, gear rail vehicles and trackless rubber-tyred vehicles, and can be applied to the floor conditions of most coal mines in China. During the operation process of the monorail crane, due to the facts such as insufficient pressure of the clamping cylinder, excessive abrasion of the driving wheel, excessive abrasion of the brake block, high-angle transportation gradient, and the damp and moisture return of the I-steel 6 track in summer, the problems of vehicle sliding and slipping after parking are prone to occurring. At present, there is little research on the problem of vehicle slipping in a monorail crane in China, and coal mining enterprises do not have reliable devices to solve this problem, so it is difficult to ensure the safety of coal mine production.

SUMMARY

In view of the above technical deficiencies, the objectives of the present disclosure are to provide a bidirectional anti-slipping apparatus in a monorail crane based on an inner ratchet mechanism, which can realize the function of bidirectional anti-slipping in the monorail crane, prevent the accidents of vehicle slipping in the monorail crane, ensure the safety of operators and realize the safe transportation.

In order to solve the above-mentioned technical problems, the following technical solutions are adopted in the present disclosure.

Provided in the present disclosure is a bidirectional anti-slipping apparatus in a monorail crane based on an inner ratchet mechanism. The apparatus includes a vehicle following stabilizing mechanism, a track, and front and rear sets of locking mechanisms with opposite rotation directions. The vehicle following stabilizing mechanism includes a protective shell. A middle vehicle capable of sliding and a hydraulic cylinder configured to control the middle vehicle to slide are arranged in the protective shell. A front vehicle and a rear vehicle are respectively fixed at front and rear ends of the protective shell through connecting rods.

Each locking mechanism includes two left and right groups of ratchet devices adapted to the track. Each of the ratchet devices includes a fixing rod, a plurality of driving plates are respectively fixed at two ends of the fixing rod on a side of the fixing rod proximate to the track. A plurality of ejectable ratchet pawls are arranged along a circumferential direction of each of the driving plates. A rotatable inner ratchet wheel is further arranged along the circumferential direction of each of the driving plates. A plurality of locking grooves adapted to the ratchet pawls are arranged in an inner wall of the inner ratchet wheel attached to the driving plate. The ratchet pawls are capable of limiting the inner ratchet wheel to rotate unidirectionally in cooperation with the locking grooves. Inner ratchet wheels on the front and rear sets of locking mechanisms rotate in opposite directions.

A front locking mechanism is arranged between the front vehicle and the middle vehicle, two ends of the fixing rod on the front locking mechanism are respectively hinged with the front vehicle and the middle vehicle through front rocker arms. A rear locking mechanism is arranged between the rear vehicle and the middle vehicle, and two ends of the fixing rod on the rear locking mechanism on rear are respectively hinged with the rear vehicle and the middle vehicle through rear rocker arms.

Preferably, a pawl chamber is arranged in the driving plate, and a plurality of notches in communication with the pawl chamber are arranged on a circumferential periphery of the driving plate. The plurality of extendable ratchet pawls corresponding to the notches are pin-connected with the pawl chamber. A resetting spring is further arranged between the ratchet pawls and the driving plate.

Preferably, an I-shaped steel is adopted as the track. Track plates are arranged on lower surfaces at two left and right sides of an upper wing plate of the I-shaped steel. Outer meshing gear rings engaged with the track plates are arranged on circumferential peripheries of the inner ratchet wheels.

Preferably, outer meshing gear rings on the inner ratchet wheels located in a same row in each set of the locking mechanisms are correspondingly arranged in parallel.

Preferably, a width of the track plate is greater than a maximum axial distance of one-sided ratchet wheels of the locking mechanisms. Two sets of the locking mechanisms maintain a certain distance from a web plate at a middle of the I-shaped steel when the two sets of locking mechanisms are disengaged from the track.

Preferably, the driving plate is fixed to the fixing rod through a driving-plate fixing-rod, and the driving plate is fixed on an outer wall of the driving-plate fixing-rod.

Preferably, each set of the locking mechanisms is provided with eight driving plates. Two ends of each fixing rod are respectively provided with two driving plates, and each driving plate is provided with a corresponding inner ratchet wheel.

Preferably, a sliding channel configured to slide the hydraulic cylinder back and forth is provided in the protective shell.

Preferably, each of the connecting rods is composed of a plurality of threaded rods threadedly connected together and capable of self-locking in length.

Preferably, the connecting rods are respectively connected to the front vehicle, the protective shell and the rear vehicle through fixing plates, and the fixing bolts are respectively fixedly mounted on outer sides of the front vehicle and the rear vehicle.

The beneficial effects of the present disclosure lie in the following. The apparatus can simultaneously complete the actions of engaging with the track and disengaging from the track of two sets of the locking mechanisms through one hydraulic cylinder according to the running direction of the monorail crane. The two sets of the locking mechanisms realizes the function of bidirectional anti-slipping in the monorail crane in cooperation with the track by utilizing the characteristic of the forward rotation and reverse locking of the inner ratchet wheel, which prevents the accidents of vehicle slipping in the monorail crane, ensures the safety of operators and realizes the safe transportation.

BRIEF DESCRIPTION OF THE DRAWINGS

In order to more clearly illustrate the embodiments of the present disclosure or the technical solutions in the prior art, the drawings that need to be used in the embodiments or the prior art will be briefly described below, and it is obvious that the accompanying drawings in the following description are merely some embodiments of the present disclosure, and those skilled in the art would obtain other drawings according to the drawings without any creative effects.

DESCRIPTION OF THE REFERENCE NUMERALS

Figure 1:
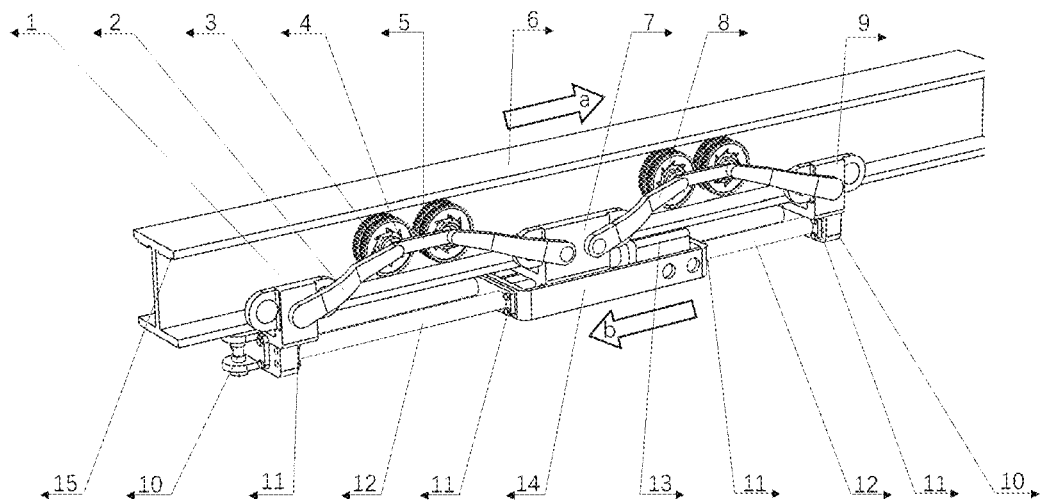
FIG. 1 illustrates a schematic diagram of a bidirectional anti-slipping apparatus in a monorail crane based on an inner ratchet mechanism walking on a track provided by an embodiment of the present disclosure.
Figure 2:
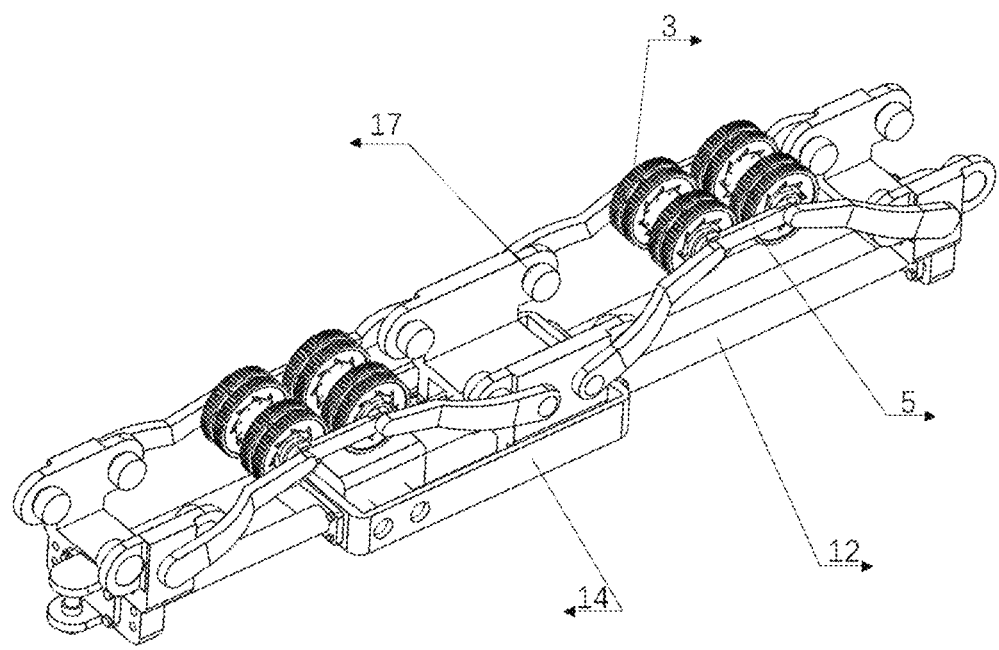
FIG. 2 illustrates a schematic structural diagram of the bidirectional anti-slipping apparatus in the monorail crane based on the inner ratchet mechanism provided by an embodiment of the present disclosure.
Figure 3:
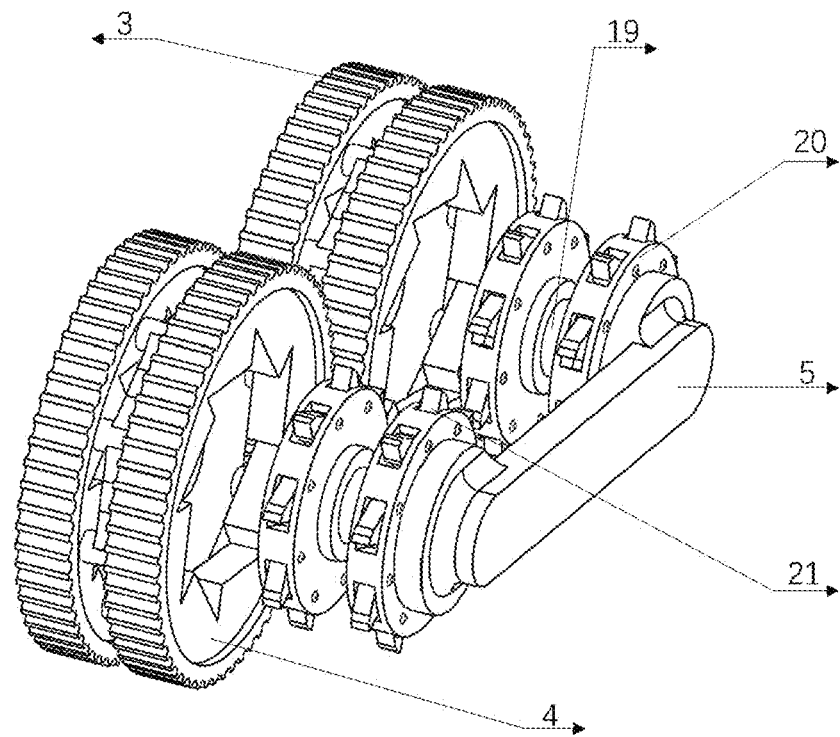
FIG. 3 illustrates a schematic diagram of connections between an inner ratchet wheel, a driving plate, and a fixing rod provided by an embodiment of the present disclosure.
Figure 4:
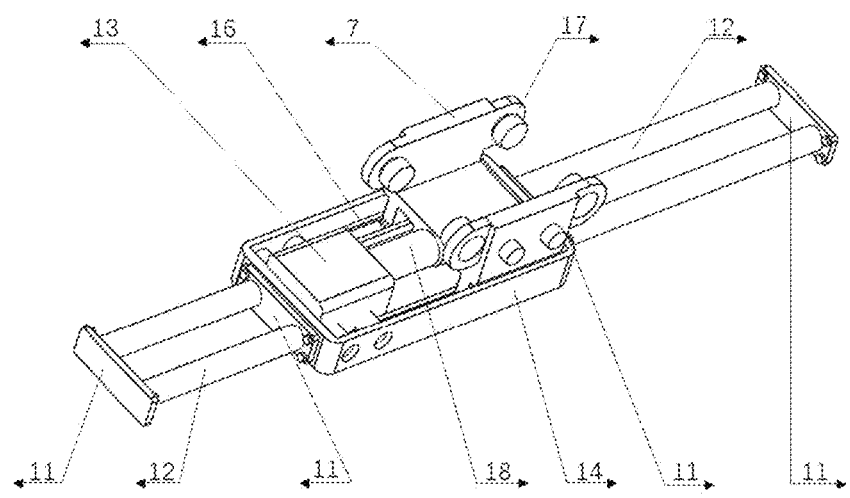
FIG. 4 illustrates a schematic structural diagram of a vehicle following stabilizing mechanism provided by an embodiment of the present disclosure.
Figure 5:
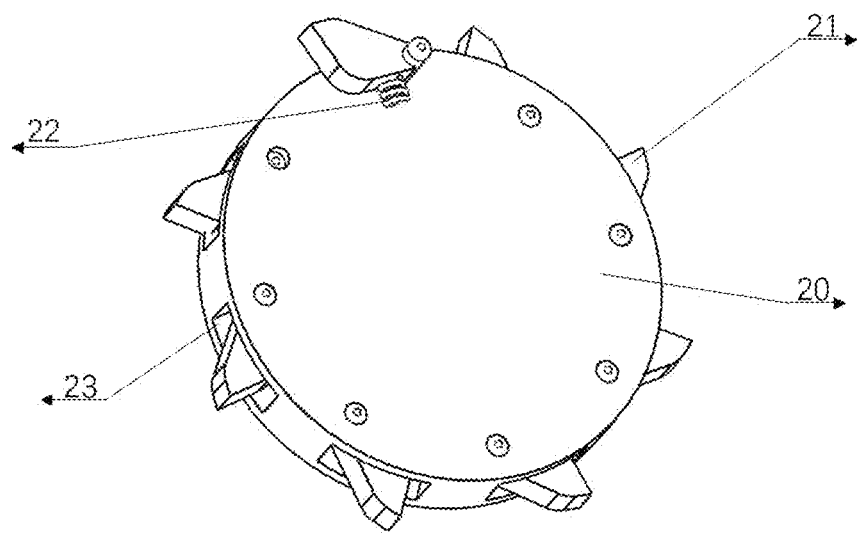
FIG. 5 illustrates a schematic structural diagram of ratchet pawls provided by an embodiment of the present disclosure.
Figure 6:
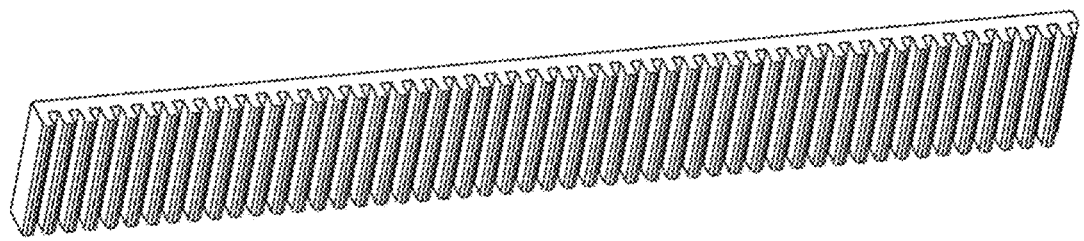
FIG. 6 illustrates a schematic structural diagram of track plates provided by an embodiment of the present disclosure.

1. Front vehicle; 2, Front rocker arm; 3, Outer meshing gear ring; 4, Inner ratchet wheel; 5, Fixing rod; 6, I-shaped steel; 7, Middle vehicle; 8, Rear rocker arm; 9, Rear vehicle; 10, Fixing bolt; 11, Fixing plate; 12, Connecting rod; 13, Hydraulic cylinder; 14, Protective shell; 15, Track plate; 16, Sliding channel; 17, Bearing wheel; 18, Piston rod; 19, Driving-plate fixing-rod; 20, Driving plate; 21, Ratchet pawl; 22, Reset spring; 23, Pawl chamber.

DETAILED DESCRIPTION OF THE EMBODIMENTS

The technical solutions in the embodiments of the present disclosure will be clearly and completely described below with reference to the accompanying drawings in the embodiments of the present disclosure. It will be apparent that the described embodiments are merely some rather than all of the embodiments of the present disclosure. Based on the embodiments of the present disclosure, other embodiments acquired by those of ordinary skilled in the art without any creative effort all belong to the protection scope of the present disclosure.

As illustrated in FIG. 1 to FIG. 6, a bidirectional anti-slipping apparatus in a monorail crane based on an inner ratchet mechanism includes a vehicle following stabilizing mechanism, a track, two front and rear sets of locking mechanisms with opposite rotation directions. The vehicle following stabilizing mechanism includes a protective shell 14. A middle vehicle 7 capable of sliding and a hydraulic cylinder 13 configured to control the middle vehicle 7 to slide are arranged in the protective shell 14. A front vehicle 1 and a rear vehicle 9 are respectively fixed at front and rear ends of the protective shell 14 through connecting rods 12.

Each locking mechanism includes two left and right groups of ratchet devices adapted to the track. Each of the ratchet devices includes a fixing rod 5, a plurality of driving plates 20 are respectively fixed at two ends of the fixing rod 5 on a side of the fixing rod proximate to the track. A plurality of ejectable ratchet pawls 21 are arranged along a circumferential direction of each of the driving plates 20. A rotatable inner ratchet wheel 4 is further arranged along the circumferential direction of each of the driving plates 20. A plurality of locking grooves adapted to the ratchet pawls 21 are arranged in an inner wall of the inner ratchet wheel 4 attached to the driving plate 20. The ratchet pawls 21 are capable of limiting the inner ratchet wheel 4 to rotate unidirectionally in cooperation with the locking grooves. Inner ratchet wheels 4 on the front and rear sets of locking mechanisms rotate in opposite directions.

A front locking mechanism is arranged between the front vehicle 1 and the middle vehicle 7, and two ends of the fixing rod 5 on the front locking mechanism are respectively hinged with the front vehicle 1 and the middle vehicle 7 through front rocker arms 2. The rear locking mechanism is arranged between the rear vehicle 9 and the middle vehicle 7, and two ends of the fixing rod 5 on the rear locking mechanism are respectively hinged with the rear vehicle 9 and the middle vehicle 7 through rear rocker arms 8. The front vehicle 1, the middle vehicle 7 and the rear vehicle 9 are all provided with bearing wheels 17 convenient for hinging with the front rock arms 2 or rear rock arms 8.

A pawl chamber 23 is arranged in the driving plate 20, and a plurality of notches in communication with the pawl chamber 23 are arranged on a circumferential periphery of the driving plate 20. The plurality of extendable ratchet pawls 21 corresponding to the notches are pin-connected with the pawl chamber 23. A resetting spring 22 is further arranged between the ratchet pawls 21 and the driving plate 20.

An I-shaped steel 6 is adopted as the track. Track plates 15 are arranged on lower surfaces at two left and right sides of an upper wing plate of the I-shaped steel 6. Outer meshing gear rings 3 engaged with the track plates 15 are arranged on circumferential peripheries of the inner ratchet wheels 4.

Outer meshing gear rings 3 on the inner ratchet wheels 4 located in a same row in each set of the locking mechanisms are correspondingly arranged in parallel.

A width of the track plate 15 is greater than a maximum axial distance of the one-sided ratchet wheels 4 of the locking mechanisms. Two sets of the locking mechanisms maintain a certain distance from a web plate at a middle of the I-shaped steel 6 when two sets of the locking mechanisms are disengaged from the track.

The driving plate 20 is fixed to the fixing rod 5 through a driving-plate fixing-rod 19, and the driving plate 20 is fixed on an outer wall of the driving-plate fixing-rod 19.

Each set of the locking mechanisms is provided with eight driving plates 20. Two ends of each fixing rod 5 are respectively provided with two driving plates 20, and each driving plate 20 is provided with a corresponding inner ratchet wheel 4.

A sliding channel 16 configured to slide the hydraulic cylinder 13 back and forth is provided in the protective shell 14.

Each of the connecting rods 12 is composed of a plurality of threaded rods threadedly connected together and capable of self-locking in length.

The connecting rods 12 are respectively connected to the front vehicle 1, the protective shell 14 and the rear vehicle 9 through fixing plates 11, and the fixing bolts 10 are respectively fixedly mounted on outer sides of the front vehicle 1 and the rear vehicle 9.

When the monorail crane operates in the direction a, the front locking mechanism rises up driven by the hydraulic cylinder 13 to engage with the track and moves forward along with the vehicle. During the operation, the driving plate 20 does not rotate, the inner ratchet wheel 4 and the outer meshing gear ring 3 are engaged with the track, rotate around the driving plate 20 to move forward, and the ratchet pawl 21 is pressed into the pawl chamber 23 during the rotation, which does not affect the rotating of the inner ratchet wheel 4. When the monorail crane slips in the direction b, the inner ratchet wheel 4 and the outer meshing gear ring 3 are rotated reversely on the track. Due to the mechanism characteristics of the inner ratchet 4, the ratchet pawl 21 is ejected from the pawl chamber 23 through the resting springs 22 to lock with the inner ratchet wheel 4, the inner ratchet wheel 4 and the outer meshing gear ring 3 stop rotating, and the gear teeth are locked with the track, which can prevent the monorail crane from slipping in the direction b.

The distance between the front vehicle 1 and the rear vehicle 9 maintains constant. When the middle vehicle 7 is driven by the hydraulic cylinder 13 to move in the direction a, under the actions of the rear rock arms 8, the rear locking mechanism is fed into the track, and the front locking mechanism is disengaged from the track. When the middle vehicle 7 is driven by the hydraulic cylinder 13 to move in the direction b, under the actions of the front rock arms 2, the front locking mechanism is fed into the track, and the rear locking mechanism is disengaged from the track.

The front and rear sets of locking mechanisms rotate in opposite directions during installation, the length of the piston rod 18 of the hydraulic cylinder 13 is adjusted according to the running direction of the monorail crane to push the corresponding locking mechanism into the track during operation, the two sets of locking mechanisms are used in cooperation to play a bidirectional locking role.

When the middle vehicle 7 moves to limit positions at the two ends of the sliding channel 16, it is ensures that the locking mechanism in the engaged state will not extrude and damage the track, and the locking mechanism in the disengaged state will maintains a safe distance from the lower wing plate of the I-shaped steel 6 to avoid the contact collision.

The apparatus does not need to be externally connected with a power source during walking, the fixing bolts 10 at the front and rear of the apparatus are connected with the monorail crane, and the vehicle following action is completed through three bearing trolleys.

In use, as illustrated in FIG. 1, the monorail crane traveling in the direction a is taken as an example, the hydraulic cylinder 13 drives the piston rod 18 in the direction b, and under the actions of the front rocker arms 2, the front locking mechanism is engaged with the track to get into an engaged state; along with the operation of the vehicle, the driving plate 20 of the front locking mechanism keeps parallel movement with the I-shaped steel 6 and does not rotate, the inner ratchet wheel 4 and the outer meshing gear ring 3 rotate anticlockwise around the driving plate 20 on the track to move forward; during the rotating process, the ratchet pawl 21 pin-connected to the driving plate 20 is pressed into the pawl chamber 23 on the driving plate 20 along with the rotation of the inner ratchet wheel 4, and the rear locking mechanism is disengaged from the track to get into the disengaged state under the actions of the rear rock arms 8.

When the monorail crane slips, the inner ratchet wheel 4 and the outer meshing gear ring 3 rotate clockwise around the driving plate 20 on the track, at this time, the ratchet pawl 21 pin-connected to the driving plate is automatically locked with the inner ratchet wheel 4 under the action of the resetting spring 22, the ratchet wheel 4 and the outer meshing gear ring 3 are locked with the track to prevent the monorail crane from further slipping. When the monorail crane travels in the direction b, the hydraulic cylinder 13 drives the piston rod 18 in the direction a, and the remaining principles are the same.

Obviously, those skilled in the art would make various modifications and variations to the present disclosure without departing from the spirit and scope of the present disclosure. Thus, if these modifications and variations of the present disclosure fall within the scope of the claims of the present disclosure and their equivalents, the present disclosure is also intended to include these modifications and variations.

What is claimed is:

1. A bidirectional anti-slipping apparatus in a monorail crane based on an inner ratchet mechanism, comprising a vehicle following stabilizing mechanism, a track, and two front and rear sets of locking mechanisms with opposite rotation directions, wherein the vehicle following stabilizing mechanism includes a protective shell, a middle vehicle capable of sliding and a hydraulic cylinder configured to control the middle vehicle to slide are arranged in the protective shell, and a front vehicle and a rear vehicle are respectively fixed at two front and rear ends of the protective shell through connecting rods;

each locking mechanism includes two left and right groups of ratchet devices adapted to the track, each of the ratchet devices includes a fixing rod, a plurality of driving plates are respectively fixed at two ends of the fixing rod on a side of the fixing rod proximate to the track, a plurality of ejectable ratchet pawls are arranged along a circumferential direction of each of the driving plates, a rotatable inner ratchet wheel is further arranged along the circumferential direction of each of the driving plates, a plurality of locking grooves adapted to the ratchet pawls are arranged in an inner wall of the inner ratchet wheel attached to the driving plate, the ratchet pawls are capable of limiting the inner ratchet wheel to rotate unidirectionally in cooperation with the locking grooves and inner ratchet wheels on the two front and rear sets of locking mechanisms rotate in opposite directions; and a front locking mechanism is arranged between the front vehicle and the middle vehicle, two ends of the fixing rod on the front locking mechanism are respectively hinged with the front vehicle and the middle vehicle through front rocker arms, a rear locking mechanism is arranged between the rear vehicle and the middle vehicle, and two ends of the fixing rod on the rear locking mechanism are respectively hinged with the rear vehicle and the middle vehicle through rear rocker arms.

2. The bidirectional anti-slipping apparatus in the monorail crane based on the inner ratchet mechanism according to claim 1, wherein a pawl chamber is arranged in the driving plate and a plurality of notches in communication with the pawl chamber are arranged on a circumferential periphery of the driving plate, the plurality of extendable ratchet pawls corresponding to the notches are pin-connected with the pawl chamber, and a resetting spring is further arranged between the ratchet pawls and the driving plate.

3. The bidirectional anti-slipping apparatus in the monorail crane based on the inner ratchet mechanism according to claim 1, wherein an I-shaped steel is adopted as the track, track plates are arranged on lower surfaces at two left and right sides of an upper wing plate of the I-shaped steel, outer meshing gear rings engaged with the track plates are arranged on circumferential peripheries of the inner ratchet wheels.

4. The bidirectional anti-slipping apparatus in the monorail crane based on the inner ratchet mechanism according to claim 3, wherein outer meshing gear rings on the inner ratchet wheels located in a same row in each set of the locking mechanisms are correspondingly arranged in parallel.

5. The bidirectional anti-slipping apparatus in the monorail crane based on the inner ratchet mechanism according to claim 3, wherein a width of the track plate is greater than a maximum axial distance of one-sided ratchet wheels of the locking mechanisms, and two sets of the locking mechanisms maintain a certain distance from a web plate at a middle of the I-shaped steel when the two sets of locking mechanisms are disengaged from the track.

6. The bidirectional anti-slipping apparatus in the monorail crane based on the inner ratchet mechanism according to claim 1, wherein the driving plate is fixed to the fixing rod through a driving-plate fixing-rod, and the driving plate is fixed on an outer wall of the driving-plate fixing-rod.

7. The bidirectional anti-slipping apparatus in the monorail crane based on the inner ratchet mechanism according to claim 1, wherein each set of the locking mechanisms is provided with eight driving plates, two ends of each fixing rod are respectively provided with two driving plates, and each driving plate is provided with a corresponding inner ratchet wheel.

8. The bidirectional anti-slipping apparatus in the monorail crane based on the inner ratchet mechanism according to claim 1, wherein a sliding channel configured to slide the hydraulic cylinder back and forth is provided in the protective shell.

9. The bidirectional anti-slipping apparatus in the monorail crane based on the inner ratchet mechanism according to claim 1, wherein each of the connecting rods is composed of a plurality of threaded rods threadedly connected together and capable of self-locking in length.

10. The bidirectional anti-slipping apparatus in the monorail crane based on the inner ratchet mechanism according to claim 1, wherein the connecting rods are respectively connected to the front vehicle, the protective shell and the rear vehicle through fixing plates, and fixing bolts are respectively fixedly mounted on outer sides of the front vehicle and the rear vehicle.

* * * * *